United States Patent [19]

Uppaluri et al.

[11] Patent Number: 5,828,944

[45] Date of Patent: Oct. 27, 1998

[54] DIVERSITY RECEPTION SIGNAL PROCESSING SYSTEM

[75] Inventors: Moorthy K. Uppaluri, Mount Prospect; Edward W. Laves, Oak Park, both of Ill.

[73] Assignee: Illinois Superconductor Corporation, Mt. Prospect, Ill.

[21] Appl. No.: 585,151

[22] Filed: Jan. 11, 1996

[51] Int. Cl.$^6$ .................................................. H04B 3/36
[52] U.S. Cl. .......................... 455/8; 455/446; 455/562; 505/202
[58] Field of Search ................................. 455/33.1, 33.3, 455/33.4, 67.1, 8, 9, 561, 562, 423, 424, 446; 379/59; 395/182.02, 182.08–182.09; 505/201, 202; 333/1, 125–126, 129, 132

[56] References Cited

U.S. PATENT DOCUMENTS

| | | | |
|---|---|---|---|
| 5,161,249 | 11/1992 | Meche et al. | 455/33.3 |
| 5,177,489 | 1/1993 | Hatch | 342/357 |
| 5,193,109 | 3/1993 | Chien-Yeh Lee | 379/60 |
| 5,244,869 | 9/1993 | Billing | 505/1 |
| 5,258,363 | 11/1993 | Hed | 505/1 |
| 5,442,363 | 8/1995 | Remondi | 342/357 |
| 5,535,423 | 7/1996 | Dupuy | 455/33.1 |
| 5,604,925 | 2/1997 | O'Malley et al. | 455/254 |

OTHER PUBLICATIONS

Neil J. Boucher, *The Cellular Radio Handbook, A Reference for Cellular System Operation, Second Edition*, Quantum Publishing, Inc. (1992), Chapter 12—pp. 152–157, and Chapter 13—pp. 192–195.

*Primary Examiner*—Andrew Faile
*Assistant Examiner*—Vincent F. Boccio
*Attorney, Agent, or Firm*—Marshall, O'Toole, Gerstein, Murray & Borun

[57] ABSTRACT

A signal receiving system has an antenna assembly divided into sectors. Each sector employs diversity by having at least two antennae for receiving signals from that sector. Signals from the antennae are passed to filters where the filters contain superconductors requiring cooling. The filters are housed in cryocoolers in a manner such that no cryocooler contains more than one filter receiving signals from a given sector. After filtering, the signals are sent to diversity receivers which combine or compare signals from antennae in the same sector.

15 Claims, 1 Drawing Sheet

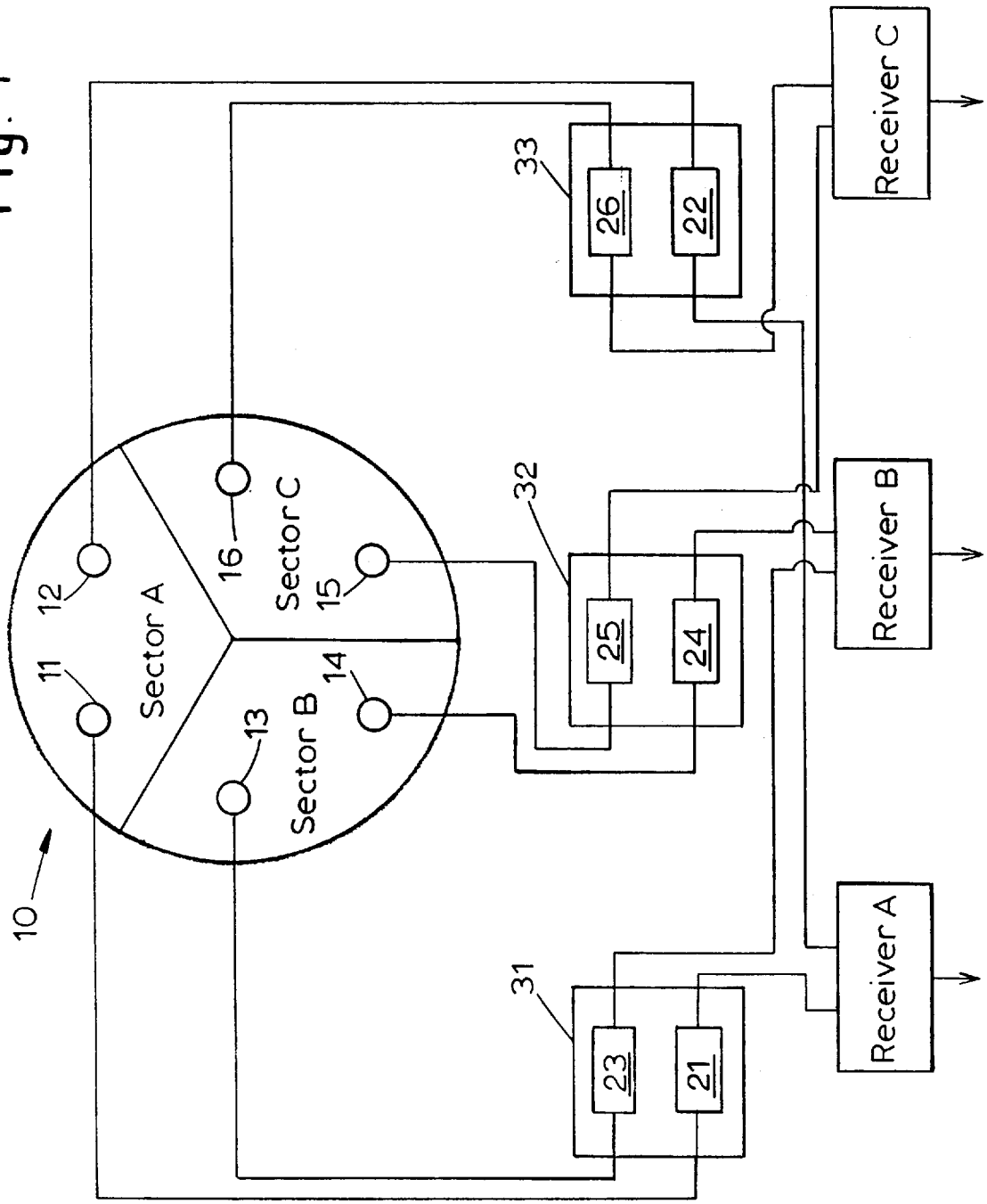

DIVERSITY RECEPTION SIGNAL PROCESSING SYSTEM

FIELD OF INVENTION

The present invention relates generally to systems having multiple inputs for receiving signals and more particularly to systems employing diversity reception and having signal processors which should be maintained at specified environmental conditions in order to optimize processor performance.

BACKGROUND ART

Signal receiving systems, such as base stations for cellular telephone networks, frequently use multiple antennae divided into geographic sectors. For instance, a cell site may have three sectors, where each sector covers a 120° horizontal arc about the cell site. In many instances, the cells will also use diversity reception in which there is more than one antenna receiving signals from a sector. The antennae for the sector are separated from each other by three or four meters so that each antenna has slightly different reception characteristics. The received signals from the separated antennae will not be identical so that when one antenna receives a multi-path fade (the result of interference due to a signal reaching an antenna via multiple paths because of reflection), the other antenna probably will not. The signals from all antennae in a sector are generally sent to a receiver, which either sums the signals or chooses the best of the signals for output.

Connected to antennae in most systems is a filter which removes interference from unwanted frequencies received by the antenna. There are numerous filter designs known in the art, but attention has lately been focused on filters which incorporate superconducting materials. Filters using superconductors have excellent filtering characteristics because they remove unwanted frequencies with a minimum of degradation to the signals which the antennae are designed to receive. A significant drawback of filters using superconductors is the need to maintain the filters at or below the critical temperature of the superconductor at which the material has essentially no electrical resistance. Liquid nitrogen baths or cryocoolers are often used to keep the materials below the required temperature.

The cost of systems requiring cooling may be greatly increased because of the number of cryocoolers needed, particularly in diversity system with two or more antennae in many sectors. One way of minimizing cost would be to provide a cryocooler for all of the filters of a sector or even the entire system. Such a solution is objectionable, however, because failure of the cryocooler results in loss of filtering capability of the sector or entire system, leading to disabling of the base station.

SUMMARY OF THE INVENTION

In accordance with one aspect of the present invention, a signal receiving system has an input assembly with a plurality of sectors, where each sector has at least two inputs. A plurality of signal processors are each connected to an input to receive a signal from that input. The signal processors should be maintained at specified environmental conditions for optimum signal processor performance. A plurality of environmental maintenance units are provided where each unit maintains at least two signal processors at the specified environmental conditions for optimum signal processor performance. An environmental maintenance unit for a signal processor connected to an input in a sector does not maintain all processors connected to all inputs in that sector.

The signal processors may be filters, and the filters may contain a superconducting material having a critical temperature. The environmental maintenance units maintain the superconducting material in the filters at or below their critical temperature. The environmental maintenance units may also maintain signal processors at or below another specified temperature or maintain the signal processors in a vacuum.

A first signal from a signal processor connected to a first input in a sector and a second signal from a signal processor connected to a second input from that sector may be sent to a receiver. The receiver outputs a third signal based on the first signal and the second signal. The inputs may be antennae for receiving radio signals. An environmental maintenance unit for a signal processor connected to an input in a sector may not maintain a signal processor connected to another input in that sector.

In accordance with another aspect of the present invention, a signal receiving system has an antenna assembly with a first sector, a second sector, and a third sector. A first antenna and a second antenna are in the first sector, a third antenna and a fourth antenna are in the second sector, and a fifth antenna and a sixth antenna are in the third sector. A first signal processor, a second signal processor, a third signal processor, a fourth signal processor, a fifth signal processor, and a sixth signal processor are connected, respectively, to the first antenna, the second antenna, the third antenna, the fourth antenna, the fifth antenna and the sixth antenna. The signal processors should be maintained at specified environmental conditions for optimal processors performance.

A first environmental maintenance unit, a second environmental maintenance unit, and a third environmental maintenance unit are provided. The first environmental maintenance unit maintains the first signal processor and the third signal processor at the specified environmental conditions. The second environmental maintenance unit maintains the fourth signal processor and the fifth signal processor at the specified environmental conditions. The third environmental maintenance unit maintains the second signal processor and the sixth signal processor at the specified environmental conditions.

Each signal processor may have an output signal. The outputs for the first signal processor and the second signal processor are sent to a first receiver. The outputs for the third signal processor and the fourth signal processor are sent to the second receiver. The outputs for the fifth signal processor and the sixth signal processor are sent to a third receiver.

In accordance with another aspect of the present invention, a signal handling apparatus has a first plurality of signal developing devices, each developing a signal having information content. At least a portion of the information content of each signal is substantially the same as the information content of another signal associated therewith. A second plurality of receivers each receives one of the signals and the signal associated with the one signal. A third plurality of environmental maintenance units each provides a controlled environment for at least two signal developing devices. The at least two signal developing devices are connected to different receivers.

Other features and advantages are inherent in the system claimed and disclosed or will become apparent to those skilled in the art from the following detailed description in conjunction with the accompanying drawing.

BRIEF DESCRIPTION OF THE DRAWING

FIG. 1 is a block diagram of a signal receiving system of the present invention.

DETAILED DESCRIPTION OF THE PREFERRED EMBODIMENT

Referring to FIG. 1, a signal receiving system includes an antenna assembly indicated generally at 10 which serves as the input for signals into the system. The antenna assembly 10 is divided into a sector A, a sector B and a sector C, where each sector is designed to receive signals from different geographic locations. The sectors are divided into essentially equal 120 degree arcs in order to cover essentially equal geographic areas. Sector A contains antennae 11 and 12; sector B contains antennae 11 and 13; and sector C contains antennae 15 and 16. The antennae 11–16 are designed to receive signals from within geographic sectors which correspond to antenna assembly sectors. Thus under optimum conditions, any signal emanating from geographic sector A, for instance, will be received by both antenna 11 and antenna 12. Under some circumstances (such as a multi-path fade), one of the antennae in a sector will receive a weaker or degraded signal. The other antenna in that sector, which is separated from the first antenna by a few meters, should still receive a desired signal.

Signals received by the antennae are passed to filters in order to eliminate unwanted frequencies from the signals. For instance, if the system is a cellular telephone base station, only signals in approximately the 800–900 megahertz range need be retained by the system. Unwanted frequencies received by the antennae 11–16 are removed by filters 21, 22, 23, 24, 25, and 26, respectively. The filters 21–26 utilize a high-temperature superconductor such as yttrium barium cupric oxides (YBCO) in order to achieve the desired filtering characteristics. Such filters include the Spectrummaster™ manufactured by the assignee of this patent application, Illinois Superconductor Corporation of Mt. Prospect, Ill. The filters 21–26 must be kept at or below the critical temperature for the superconducting material, which, in the case of YBCO, is approximately −180° C. In order to maintain the desired temperature the filters may be cooled by cryocoolers 31, 32 and 33. Suitable cryocoolers can be obtained from CTI-Cryogenics of Mansfield Mass.

The cryocoolers 31–33 are each designed to provide cooling for two filters. Thus, each cryocooler 31–33 would be capable of cooling all filters for a sector. Such an arrangement, however, is undesirable because the failure of a cryocooler would effectively disable both antennae from a sector so that the system would not be able to use any signal emanating from a source located in that sector. Instead, the cryocooler 31 cools the filter 21 and the filter 23, which receive signals from sectors A and B, respectively. The cryocooler 32 cools the filter 24 and the filter 25, which receive signals from sectors B and C, respectively. The cryocooler 33 cools the filter 22 and the filter 26, which receive signals from sectors A and C, respectively. Therefore, no cryocooler cools all filters receiving signals from a given sector, so that the failure of any one cryocooler will not completely disable a sector.

Signals from the antennae 11 and 12 in sector A pass through the filters 21 and 22 and enter a receiver A. Signals from the antennae 13 and 14 in sector B pass through the filters 23 and 24 and into a receiver B. Signals from the antennae 15 and 16 in sector C pass through the filters 25 and 26 and enter a receiver C. The receivers A, B, and C are diversity receivers and will generally be one of two types. The first type is a diversity combining receiver which aligns the phases of the incoming signals and adds them to output a single combined signal. Diversity combining receivers generally have a gain of approximately 6dB over a system without diversity. The second type of diversity receiver is a switch diversity or selection diversity receiver, which compares the best of the two signals received and outputs only the signal having the greater magnitude. The switch diversity receiver generally has a gain of about 3 dB over a system without diversity.

If a cryocooler fails, for instance the cryocooler 31, no useful signal will be emitted from the filter 21 or the filter 23. Therefore, the receiver A and the receiver B will receive essentially only one signal each, from the filter 22 and the filter 24, respectively. The receiver A and the receiver B will then lose the gain which diversity had otherwise afforded the system, resulting in a loss of either approximately 6 dB or 3 dB. While such a loss is significant, it is far less than the loss which would have occurred if the cryocooler 31 cooled, for instance, the filters 21 and 22. In that case, upon failure of the cryocooler 31, the receiver A would not receive a useful signal from either the filter 21 or the filter 22, resulting in no useful signal output from the receiver A.

Numerous modifications to the system of FIG. 1 are possible while still taking advantage of the present invention. For instance, each sector could have more than two antennae. Optimally, in such a situation, the various filters receiving signals from a sector should be cooled by different cryocoolers, or at least, should not all be cooled by the same cryocooler. The system could also have as few as two sectors, in which case a cryocooler could cool a filter receiving signals from a first sector and a filter receiving signals from a second sector. The system could also have more than three sectors, in which case there are numerous combinations of filters and cryocoolers which would be acceptable, so long as no cryocooler cooled all filters receiving signals from a particular sector.

Although the cryocoolers in FIG. 1 cool two filters, larger cryocoolers providing cooling for three or more filters are possible. For instance, if the cryocoolers provide cooling for three filters, only two cryocoolers would be necessary for the system of FIG. 1. In that case, each of the two cryocoolers would cool one filter for each sector.

Although filters using superconductors require cryocooling, other types of environmental maintenance units could be substituted for the cryocoolers. For instance, it is sometimes desirable to maintain electronic components (including filters having superconductors) in a vacuum. The disadvantages of failure of vacuum in such a system would be similar to those for cooling failure, so a vacuum system could also take advantage of the claimed invention. Similarly, signal processors other than filters could be used in the system.

The foregoing detailed description has been given for clearness of understanding only, and no unnecessary limitations should be understood therefrom, as modifications would be obvious to those skilled in the art.

We claim:

1. A signal receiving system comprising:
    an input assembly comprising a plurality of sectors wherein each of the sectors has at least two inputs;
    a plurality of signal processors wherein each signal processor is connected to an input to receive a signal from that input and wherein the signal processors should be maintained at specified environmental conditions for optimum signal processor performance; and a plurality of environmental maintenance units wherein each of the units maintains at least two of the signal processors at the specified environmental conditions for optimum performance of the signal processors;

wherein an environmental maintenance unit for a signal processor connected to an input in a sector does not maintain all signal processors connected to all inputs in that sector;

a first signal from a signal processor connected to a first input in one of the sectors and a second signal from a signal processor connected to a second input from that sector are sent to a receiver; and the receiver outputs a third signal based on the first and the second signal.

2. The system of claim 1 wherein:

the signal processors are filters and the filters contain a superconducting material having a critical temperature; and the environmental maintenance units maintain the superconducting material in the filters at or below the critical temperature.

3. The system of claim 1 wherein the environmental maintenance units maintain the signal processors at or below a specified temperature.

4. The system of claim 1 wherein the environmental maintenance units maintain the signal processors in a vacuum.

5. The system of claim 1 wherein the inputs are antennae for receiving radio signals.

6. The system of claim 1 wherein one of the environmental maintenance units for one of the signal processors connected to one of the inputs in a sector does not maintain another one of the signal processors connected to another input in that sector.

7. A radio signal receiving system comprising:

an antenna assembly having a first sector, a second sector and a third sector;

a first antenna and a second antenna in the first sector;

a third antenna and a fourth antenna in the second sector;

a fifth antenna and a sixth antenna in the third sector;

a first signal processor, a second signal processor, a third signal processor, a fourth signal processor, a fifth signal processor and a sixth signal processor connected, respectively, to the first antenna, the second antenna, the third antenna, the fourth antenna, the fifth antenna and the sixth antenna wherein the signal processors should be maintained at specified environmental conditions for optimal signal processor performance; and a first environmental maintenance unit, a second environmental maintenance unit and a third environmental maintenance unit;

wherein the first environmental maintenance unit maintains the first signal processor and the third signal processor at the specified environmental conditions, the second environmental maintenance unit maintains the fourth signal processor and the fifth signal processor at the specified environmental conditions, and the third environmental maintenance unit maintains the second signal processor and the sixth signal processor at the specified environmental conditions.

8. The system of claim 7 wherein:

the signal processors are filters and the filters contain a superconducting material having a critical temperature; and the environmental maintenance units maintain the superconducting material in the filters at or below the critical temperature.

9. The system of claim 7 wherein the environmental maintenance units maintain the signal processors at or below a specified temperature.

10. The system of claim 7 wherein the environmental maintenance units maintain the signal processors in a vacuum.

11. The system of claim 7 wherein:

each signal processor has an output signal;

the output for the first signal processor and the second signal processor are sent to a first receiver;

the output for the third signal processor and the fourth signal processor are sent to a second receiver; and the output for the fifth signal processor and the sixth signal processor are sent to a third receiver.

12. The system of claim 11 wherein each receiver receives a first signal and a second signal and outputs a third signal based on the first signal and the second signal.

13. A radio signal receiving system comprising:

an antenna assembly having a first sector, a second sector and a third sector;

a first antenna and a second antenna in the first sector;

a third antenna and a fourth antenna in the second sector;

a fifth antenna and a sixth antenna in the third sector;

a first filter, a second filter, a third filter, a fourth filter, a fifth filter, and a sixth filter connected, respectively, to the first antenna, the second antenna, the third antenna, the fourth antenna, the fifth antenna, and the sixth antenna, wherein each of the filters contains a superconducting material that must be maintained at or below a critical temperature; and a first cryocooler, a second cryocooler, and a third cryocooler;

wherein the first cryocooler maintains the first filter and third filter at or below the critical temperature, the second cryocooler maintains the fourth filter and the fifth filter at or below the critical temperature, and the third cryocooler maintains the second filter and the sixth filter at or below the critical temperature;

each of the filters has an output signal;

the outputs for the first filter and the second filter are sent to a first receiver;

the outputs for the third filter and the fourth filter are sent to a second receiver; and the outputs for the fifth filter and the sixth filter are sent to a third receiver.

14. The system of claim 13 wherein each of the receivers receives a first signal and a second signal and outputs a third signal based on the first signal and the second signal.

15. A signal handling apparatus, comprising:

a first plurality of signal developing devices each developing a signal having information content therein wherein at least a portion of the information content of each of the signals is substantially the same as the information content of another one of the signals associated therewith; and a second plurality of receivers each receiving one of the signals and the signal associated with the one signal; and a third plurality of environmental maintenance units each providing a controlled environment for at least two of the signal developing devices wherein the at least two of the signal developing devices are connected to different receivers.

* * * * *